April 10, 1951 C. W. SINCLAIR 2,548,626
TRACK SHOE

Filed March 22, 1944 3 Sheets-Sheet 1

INVENTOR.
CHARLES W. SINCLAIR
BY
ATTORNEYS

April 10, 1951     C. W. SINCLAIR     2,548,626
TRACK SHOE

Filed March 22, 1944     3 Sheets-Sheet 2

INVENTOR.
CHARLES W. SINCLAIR
BY
ATTORNEYS

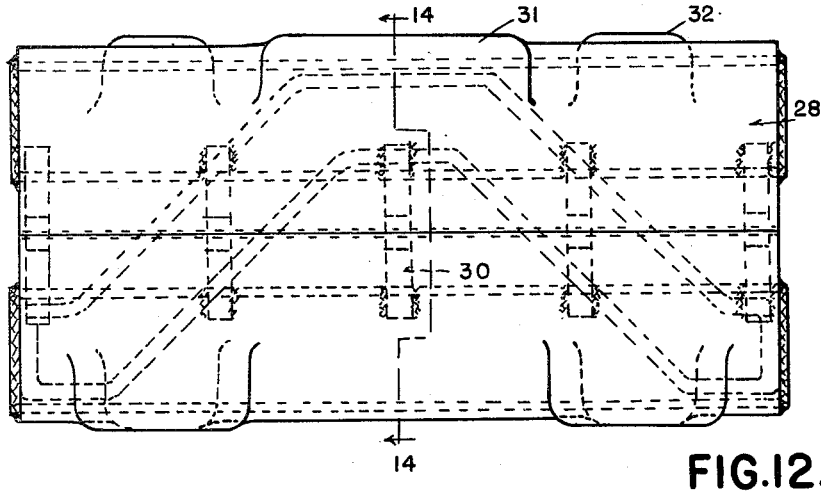
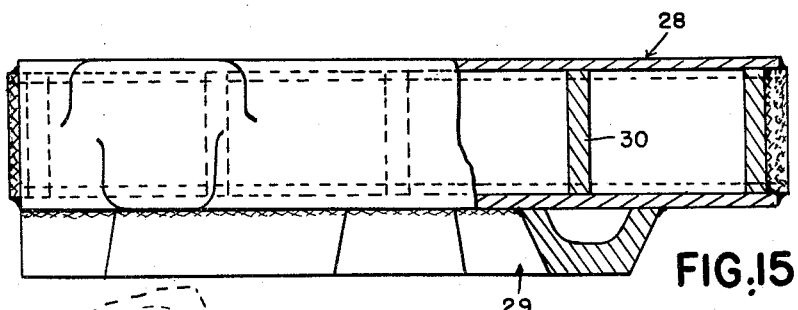
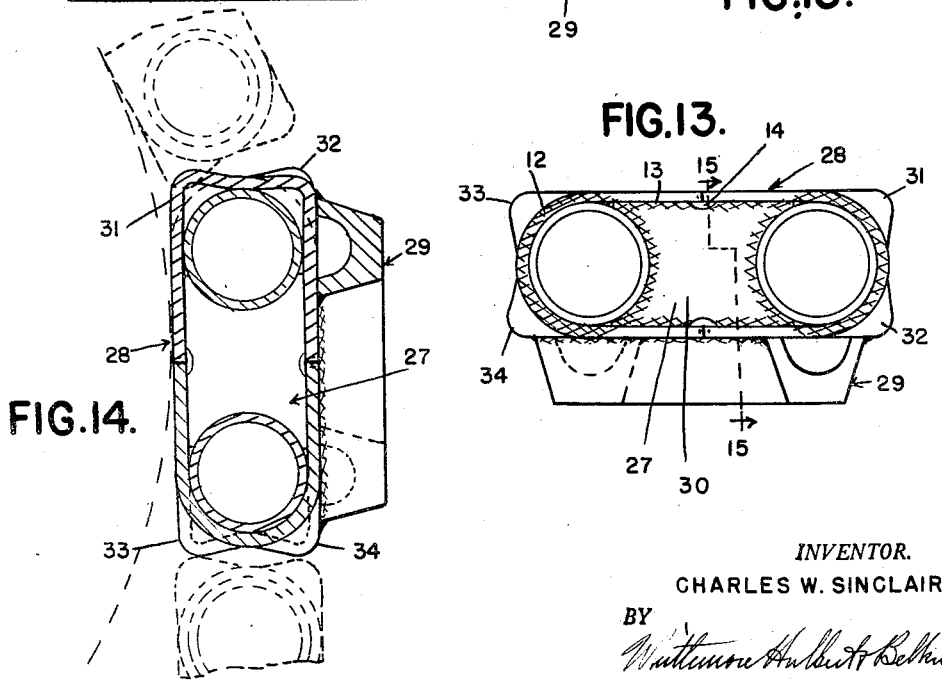

Patented Apr. 10, 1951

2,548,626

UNITED STATES PATENT OFFICE 2,548,626

TRACK SHOE

Charles W. Sinclair, Detroit, Mich., assignor to Kelsey-Hayes Wheel Company, Detroit, Mich., a corporation of Delaware Application March 22, 1944, Serial No. 527,617

5 Claims. (Cl. 305—10)

The invention relates to vehicle track shoes and refers more particularly to shoes which are connected to form an endless ground engaging track for a vehicle, such as a tank, truck, tractor, and the like.

The invention has for one of its objects to provide an improved vehicle track shoe which is of relatively light weight and at the same time is of relatively strong construction to withstand the stresses to which it may be ordinarily subject.

The invention has for another object to so construct the shoe that it has an air space and is watertight so that the trapped air increases the buoyancy of the shoe.

The invention has for a further object to provide an improved method of making the shoe.

With these and other objects in view, the invention resides in the novel features as more fully hereinafter set forth.

In the drawings:

Figure 12 is a top plan view of another shoe embodying the invention;

Figure 13 is a side view thereof;

Figure 14 is a cross section on the line 14—14 of Figure 12 showing portions of adjacent connected shoes.

Figure 15 is a cross section on the line 15—15 of Figure 13.

Figure 1:
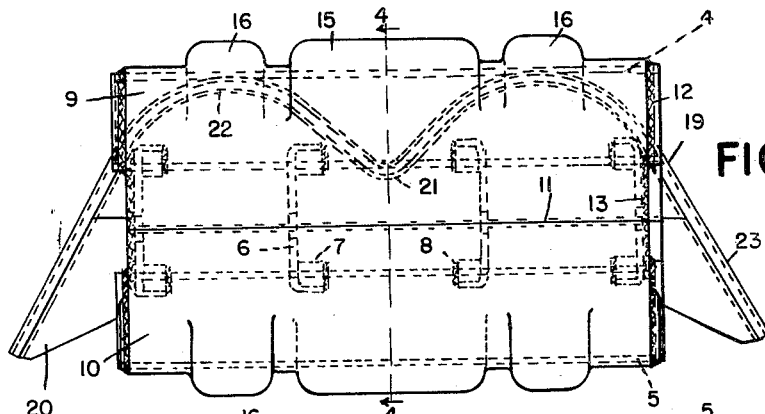
Figure 1 is a top plan view of a vehicle track shoe embodying the invention.
Figure 2:
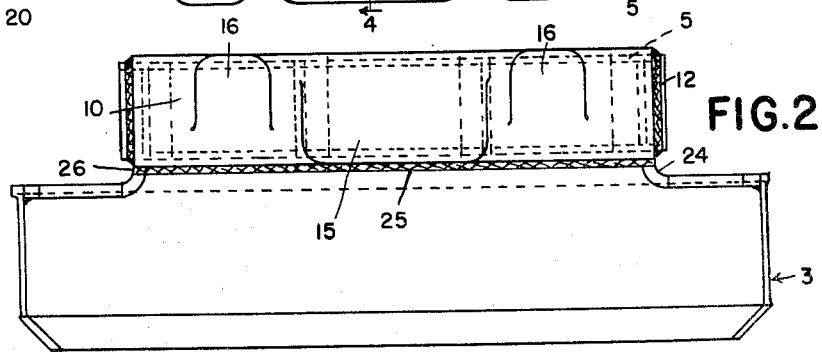
Figure 2 is a rear elevation thereof.
Figure 5:
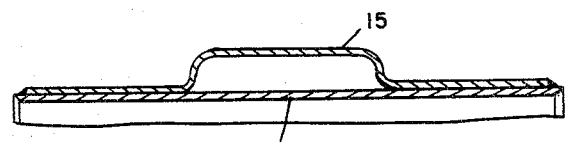
Figure 5 is a cross section on the line 5—5 of Figure 3.
Figure 4:
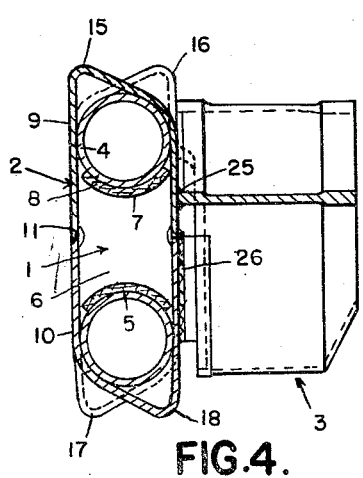
Figure 4 is a cross section on the line 4—4 of Figure 1.
Figure 3:
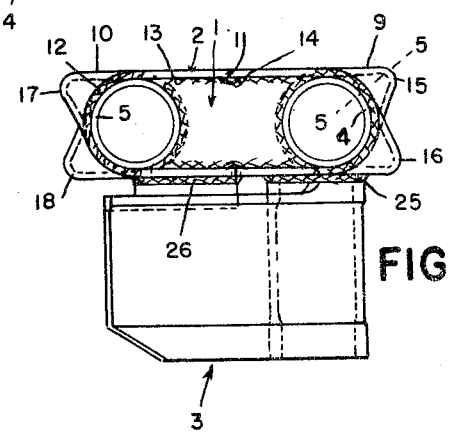
Figure 3 is a side elevation thereof.

While the vehicle track shoe embodying the invention may be used with a number of different types of vehicles, it is shown in the present instance as designed particularly for use with an amphibious tank and comprises the bearing unit 1, the casing 2 encircling and fixedly secured to the bearing unit, and the cleat and brace unit 3 fixedly secured to the ground side or bottom wall of the casing.

The bearing unit 1 comprises the spaced substantially parallel tubular bearing members 4 and 5 and the spacers 6 extending between and fixedly secured to the bearing members. The bearing members are alike and are seamless or welded metal and, more particularly, steel tubes which are sized both internally and externally. The spacers are alike and are sheet metal and, more particularly, sheet steel plates of a width substantially equal to the external diameter of the tubes. The spacers have integral transverse flanges 7 at their ends which are made arcuate or concave to fit the tubes. The spacer plates extend transversely of and preferably at right angles to the tubes and are spaced longitudinally of the tubes and united thereto as by being welded or brazed at 8 along the ends of the transverse flanges 7. The tubular bearing members are constructed to tightly engage rubber bushings which are spaced longitudinally of and are vulcanized to pins which extend through the bearing members.

The casing 2 is formed of the complemental sheet metal and, more particularly, sheet steel channel-shaped sections 9 and 10 which are preferably pressed from flat sheet blanks. The sections are opposed and open toward each other and are fixedly secured to each other by butt-welding the adjacent edges together at 11 to form a casing with open ends. The casing thus formed is sized to have a shrink fit on the bearing unit 1 and is fixedly secured to the bearing unit by welding the casing at its ends to the tubes and the end spacer plates at 12 and 13, respectively. It will be noted that all of the spacer plates are provided with the notches 14 in their opposite edges substantially midway of their ends. These notches are of a size to clear any internal weld flash which may remain after rough-trimming the weld flash resulting from the welding of the two casing sections together. The welding material for uniting the casing to the tubes and the end spacer plates is continuous or endless and closes the notches in the end spacer plates so that the shoe has a water-tight air space between the tubes and the trapped air serves to increase the buoyancy of the shoe.

The shoe is one of a number of like shoes which form an endless track and are pivotally connected together by means including the previously mentioned pins which extend through the tubes 4 and 5. For the purpose of interlocking the shoes to laterally guide and position the same with respect to each other when they are angularly positioned with respect to each other, as when passing around a wheel, the casing 2 has its front wall formed with the projections 15 and 16 and its rear wall formed with the complementally arranged projections 17 and 18, the arrangement being such that the projections in the front and rear walls of immediate adjacent shoes interfit. The projections are substantially V-shaped bosses formed by depressing the bases of the channel-shaped sections 9 and 10 before welding the same together. The projection 15 is located centrally between the ends of the casing and the projections 16 are located at opposite ends of the projection 15. The projection 17 is like the projection 15 and is located centrally between the ends of the casing and the projections 18 are like the projections 16 and located at opposite ends of the projection 17. The projection 15 has a wall in continuation of the top wall of the casing and the projections 16 have walls in continuation of the bottom wall of the casing. The projections 17 and 18 are the reverse of the projections 15 and 16, the projection 17 having a wall in continuation of the bottom wall of the casing and the projections 18 having walls in continuation of the top wall of the casing. With this arrangement it will be seen that when adjacent shoes are angularly arranged with respect to each other, as when passing over a wheel, the projection 15 of one shoe extends between the projections 18 of the immediately adjacent shoe so that these shoes are laterally interlocked. The air spaces formed by the projections 15, 16, 17 and 18 also serve to increase the buoyancy of the shoe. In this connection, the weight of an actual shoe in air is 8.42 pounds and its weight in water is 6.51 pounds so that the air trapped in the space between the tubes and in the projections accounts for a buoyancy of 1.91 pounds.

The portions of the front and rear walls of the casing between the projections and also laterally outwardly beyond the projections are arcuate or concave and have a radius such that when the casing is shrunk on to the bearing unit these portions tightly fit the front and rear portions of the tubes of the bearing unit. Also the casing top and bottom walls tightly engage the top and bottom edges of the spacers with the result that the spacers are placed under compression vertically, as well as horizontally. By reason of the flanges at the ends of the spacers sufficient area is provided to prevent indentation or collapse of the tubes.

The cleat and brace unit 3 comprises the cleat 19 and the braces 20, both the cleat and braces being formed of sheet metal and, more particularly, sheet steel. The cleat extends transversely of the bottom wall of the casing and has the central rearwardly extending V-shaped portion 21 the legs of which merge into the arcuate portions 22, each of which in turn merges into the rearwardly extending wing portions 23. The wing portions bridge beyond the ends of the casing and their top edges are fixedly secured to the braces 20 which close the spaces between the wing portions of the casing and have upturned edges 24. The portions of the top edge of the cleat opposite the bottom wall of the casing and also the upturned edges of the braces are fixedly secured to the bottom wall of the casing as by being welded thereto at 25 and 26, respectively. With this arrangement, the cleat and brace unit forms an effective paddle for propelling the tank in water.

Figure 8:
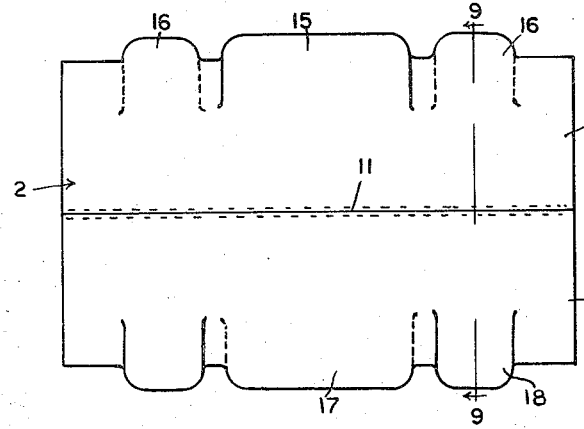
Figure 8 is a top plan view of the casing of the shoe.
Figure 9:
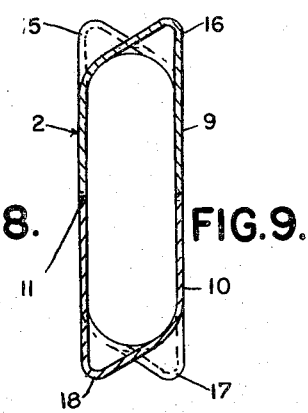
Figure 9 is a cross section on the line 9—9 of Figure 8.
Figure 7:
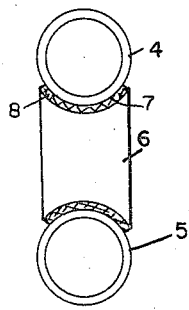
Figure 7 is a side elevation thereof.
Figure 6:
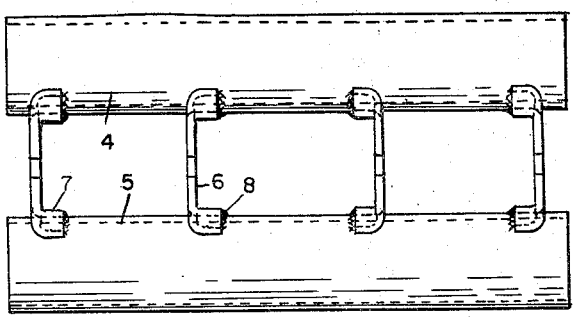
Figure 6 is a top plan view of the bearing unit of the shoe.
Figure 10:
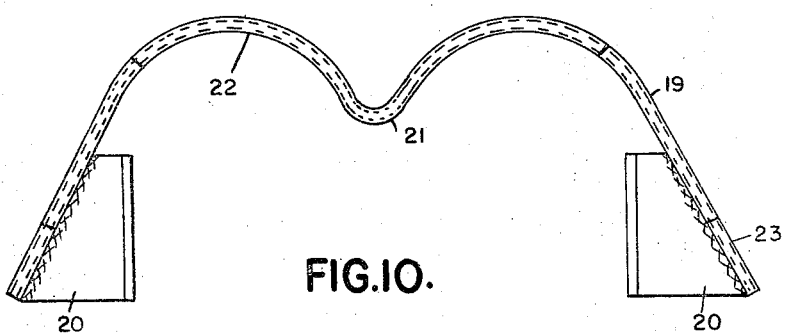
Figure 10 is a bottom plan view of the cleat and brace unit.
Figure 11:
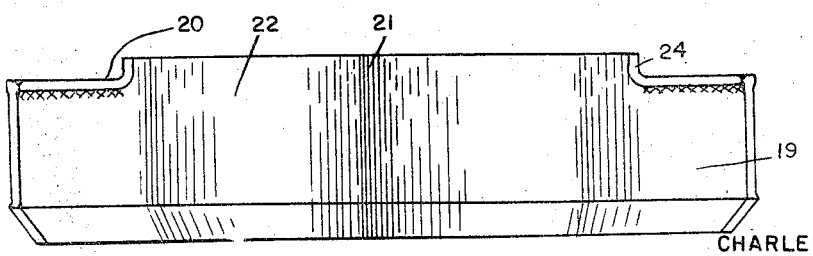
Figure 11 is a rear elevation thereof.

In the manufacture of the shoe the bearing unit 1 is formed by arranging the spacer plates 6 transversely of and preferably at right angles to and between the tubes 4 and 5 which have been sized and then the spacer plates are united to the tubes by being welded or brazed at 8, the unit as thus formed being shown in Figures 6 and 7. The casing 2 is formed by pressing from flat sheet steel blanks the channel-shaped sections 9 and 10, the projections 15 and 16 and the like projections 17 and 18, respectively, being preferably formed during the pressing operation. The sections are then placed in opposed relation with their channels opening toward each other and with their projections reversed to be complemental, after which the adjacent edges are united by butt-welding the same together at 11. The weld flash both inside and outside the casing is then rough-trimmed. Then the casing is heat treated to secure the required hardness of the metal, after which the casing is sized in a suitable manner as by pushing a predeterminedly sized plug through the casing. The casing as thus formed is shown particularly in Figures 8 and 9. The cleat and brace unit is formed by properly locating the cleat 19 and the braces 20 and then uniting their adjacent edges as by welding the same together, this unit being shown particularly in Figures 10 and 11.

The next step in the manufacture comprises uniting the cleat and brace unit to the casing by welding the two together at 25 and 26, respectively. Then the assembly comprising the casing and the cleat and brace unit is heated to a temperature of from 600° F. to 700° F., which is below the draw temperature, to relieve the metal, including the welds, from strain and to expand the casing sufficiently to give it the required shrink to fit on the bearing unit. At this time, the bearing unit is inserted into the casing, after which the casing is allowed to shrink upon and tightly grip the bearing unit. Then the casing is united to the tubes 4 and 5 and the end spacer plates by welding the same at 12 and 13, respectively, the welding material closing the notches 14 in the end spacer plates and being continuous or endless to make the completed shoe water-tight and to trap air in the air space formed between the tubes of the shoe and also the air spaces in the projections 15, 16, 17 and 18.

In the modification illustrated in Figures 12, 13, 14 and 15, the shoe comprises the bearing unit 27, the casing 28 encircling and fixedly secured to the bearing unit, and the cleat 29 fixedly secured to the ground side or bottom wall of the casing.

The bearing unit 27 is formed in the same manner as the bearing unit 1, with the exception that the spacers 30 are plates of greater thickness than the spacer plate 6 and are preferably welded or brazed at both sides to the tubes. The thickness is sufficient to avoid indentation or collapse of the tubes under the compression exerted by the casing when the latter is shrunk on the bearing unit.

The casing 28 is also formed in generally the same manner as the casing 2, with the exception that the complementally arranged projections in the front and rear walls of the casing 28 differ and the weld flash inside the casing resulting from the butt-welding of the casing sections is not removed. More particularly, the casing has in its front wall the projection 31 which is located centrally between the ends of the casing and has a wall in continuation of the top wall of the casing. The casing also has at the opposite ends of the projection 31 the projections 32 each having a wall in continuation of the bottom wall of the casing. The rear wall of the casing has the pair of projections 33 each with a wall in continuation of the top wall of the casing and the pair of projections 34 each with a wall in continuation of the bottom wall of the casing. The projections are so arranged that when the shoe is annularly arranged with respect to an adjacent shoe, such as shown in Figure 14, the projection 31 extends between the projections 33 to laterally interlock the shoes.

The cleat 29 differs from the cleat and brace unit 3 in that the cleat 29 is generally V-shaped and is located within the ends of the casing so that braces are not necessary. The cleat is also preferably made hollow to decrease its weight.

In the manufacture, the steps of making the bearing unit and the casing are substantially the same as those in making the bearing unit 1 and the casing 2. Also the cleat is welded to the casing prior to shrink-fitting the casing on the bearing unit so that the welds are relieved from stress.

What I claim as my invention is:

1. A vehicle track shoe comprising a bearing unit formed of substantially parallel tubes and spacers spaced longitudinally of and extending transversely of and united to said tubes and a casing encircling said bearing unit and having portions engaging said tubes and spacers, and means for uniting said casing to said tubes and certain of said spacers, said means forming a water-tight seal.

2. A vehicle track shoe comprising a casing, a bearing unit extending within and united to said casing and formed of substantially parallel tubes extending through said casing and spacer plates between and extending transversely of and united to said tubes, certain of said spacer plates being adjacent to the ends of said casing, and material for uniting said casing to said tubes and last mentioned spacer plates, said material being endless and making a water-tight joint between said casing and tubes and last mentioned spacer plates.

3. A vehicle track shoe comprising a bearing unit formed of tubes and spacers spaced longitudinally of and extending transversely of and united to said tubes, and a casing encircling and shrunk on said bearing unit and placing the same under compression, said spacers having arcuate flanges at their ends fitting said tubes and providing sufficient area to avoid indenting said tubes.

4. A vehicle track shoe comprising end plates, an intermediate plate and tubes extending transversely of and fixedly secured to the ends of said end and intermediate plates, said plates and tubes forming a bearing unit, and a casing encircling said bearing unit and having portions engaging and fixedly secured to said tubes, said casing having a cleat secured to the ground side thereof.

5. A vehicle track shoe comprising a bearing and a casing for said bearing having hollow bosses in its front wall with one boss having a wall in continuation of the top wall of the casing and other bosses at the opposite ends of said first mentioned boss, each of said other bosses having a wall in continuation of the bottom wall of the casing, said casing also having hollow bosses in its rear wall corresponding to said first mentioned bosses with one of said corresponding bosses being like said first mentioned boss and having a wall in continuation of the bottom wall of the casing and other corresponding bosses at the opposite ends of said first mentioned boss in the rear wall and like said second mentioned bosses, each of said other corresponding bosses having a wall in continuation of the top wall of said casing.

CHARLES W. SINCLAIR.

REFERENCES CITED

The following references are of record in the file of this patent:

UNITED STATES PATENTS

| Number | Name | Date |
|---|---|---|
| 2,039,012 | Lindberg | Apr. 28, 1936 |
| 2,067,269 | Johnson et al. | Jan. 12, 1937 |
| 2,211,897 | Johnston | Aug. 20, 1940 |
| 2,234,927 | Kubaugh | Mar. 11, 1941 |
| 2,290,109 | Mayne | July 14, 1942 |
| 2,321,202 | Heine | June 8, 1943 |
| 2,353,124 | Burgess | July 11, 1944 |
| 2,366,450 | Krotz | Jan. 2, 1945 |
| 2,422,483 | Haushalter | June 17, 1947 |